Feb. 23, 1943.  I. M. TAYLOR  2,311,789
TIRE IRON
Filed April 13, 1942
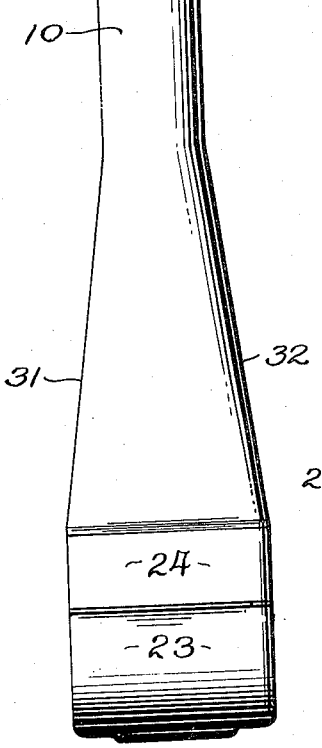
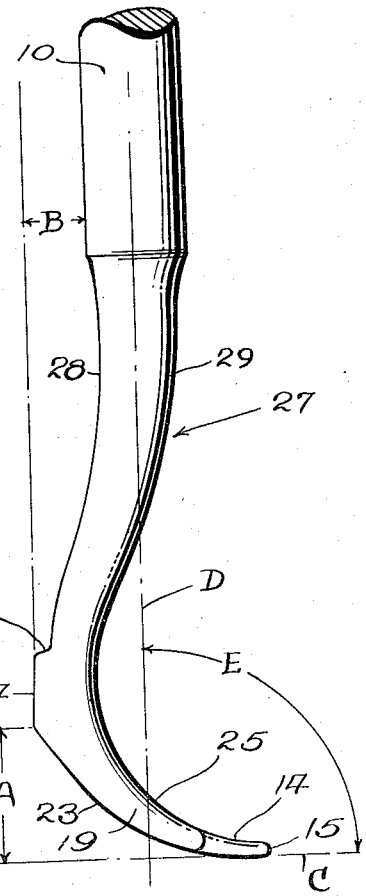
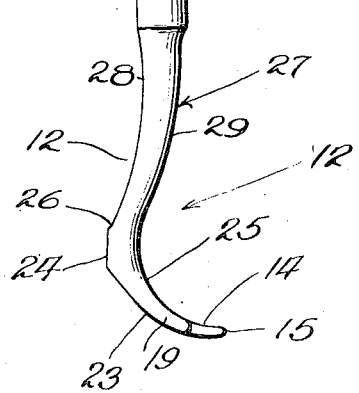
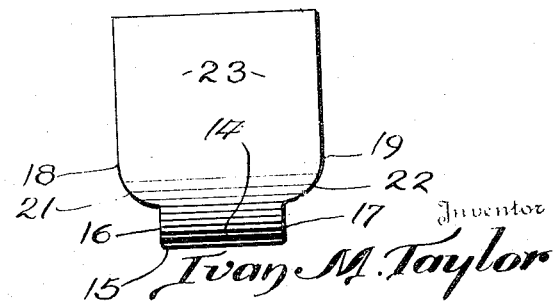
Inventor
Ivan M. Taylor
By L. F. Hammand
Attorney Patented Feb. 23, 1943

2,311,789

UNITED STATES PATENT OFFICE 2,311,789

TIRE IRON

Ivan M. Taylor, United States Army

Application April 13, 1942, Serial No. 438,678

2 Claims. (Cl. 157—6)

(Granted under the act of March 3, 1883, as amended April 30, 1928; 370 O. G. 757)

The invention described herein, if patented, may be manufactured and used by or for the Government for governmental purposes, without the payment to me of any royalty thereon.

The present invention relates to tire tools and more specifically to a hand tool of the general type commonly used in changing pneumatic vehicle tires and particularly in the operation of removing the tire from the rim.

The present applicant is aware that the art to which this invention relates is an old one and that, throughout the years since the invention of the pneumatic tire, literally thousands of different designs of tire tools have been manufactured, sold and used in the operation of changing tires or removing the tire casings from the wheel rims.

It is also appreciated that many types of these tools possess common structural characteristics in that almost all of them include a hand lever and wedging surface designed to pry the tire bead loose from the rim, but it is submitted that even at the present stage of development of the art the types of tools available are not entirely satisfactory, and that there is a very definite and well recognized need for an improved type of tool so designed as to facilitate the work of tire changing and reduce the time required for such operations to a minimum.

The necessity for a tool of this character has been particularly brought to attention of military authorities at the present time, since the present war has resulted in the production of thousands of military motor vehicles and the large and heavy types of tires customarily used on such vehicles are extremely difficult to remove by any form of tool commercially available in the market. It may be noted in passing that it is of utmost importance in military operations to provide a type of tire iron so designed that the tire maye be removed and replaced in the shortest possible length of time, in order that a damaged tire on one vehicle of a motorized unit will not delay the vehicle sufficiently so that it cannot overtake the column to which it is attached.

In view of the thousands of different confiurations of tire irons known to the art at the present time, and in view of the fact that the conventional mode of operation of all such tools is thoroughly understood in the art, it is believed that the tool illustrated in the present application will be thoroughly understood by those skilled in the art.

It should be noted, however, that tools of this character are entirely utilitarian in purpose and that the value of the tool in actual practice depends on the details of shape and dimensions rather than on any fundamentally different theory of operation. In this connection it may be pertinent also to point out that the personnel of the United States Army has engaged in considerable experimental and development work in an attempt to devise a tool of size, shape and configuration such that it will possess practical advantages in the actual task of changing vehicle tires.

The tool comprising the subject matter of the present application is a result of this development work, and it is submitted that the peculiarities of shape and configuration of the tool result in marked advantages over the prior art so that the task of changing tires is eased and simplified and so that fewer types of tools are required than in the prior art without sacrifice of efficiency.

Referring now more particularly to the drawing, attached to and forming a part of the present specification, Fig. 1 is a side elevational view of a tire iron constructed in accordance with the teachings of the present disclosure.

Fig. 2 is an enlarged plan view of the head portion of the tire iron,

Fig. 3 is a side elevational view of Fig. 2, and

Fig. 4 is an end view thereof.

The tool illustrated in the drawing comprises in general a long cylindrical handle 10 having a sharpened point 11 at one end and a tire engaging head 12 at the other, and is preferably formed of metal. The head portion 12 of the tool has a center tongue 14 defined by the thin straight leading edge 15 and the two side edges 16 and 17 extending back from the leading edge and in approximately right-angled relationship with leading edge.

Side shoulders 18 and 19 on each side of the center tongue 14 are integral with the tongue and are curved inwardly at the points 21 and 22 respectively to meet the rearward ends of the side edges 16 and 17. The shoulders 18 and 19 are contiguous with the center tongue 14 and are curved to form a broad smooth convex face 23 extending back from the leading edge 15 of the center tongue to a flat surface or pad 24. The flat side edges of the shoulders are substantially thicker than the leading edge 15, or side edges 16 and 17 of the tongue.

The pad 24 is parallel with the plane of the axis of the tool handle, but it is spaced substantially back from the leading edge 15 of the tongue as indicated by the reference character A in the drawing, and it is off set from the center of the tool handle a distance indicated by the reference character B.

The inner surface 25 of the head is formed in a smooth concave curvature across the width of the tool, and the curvature of the inner surface 25 and outer face 23 are so related that the head portion tapers toward the edge 15 and is progressively thinner as the edge 15 is approached.

The curvatures of the surfaces 23 and 25 of the head are such that the forward leading edge 15 lies in a plane normal to the axis of the handle portion 10; that is, a line tangent to the leading edge of the tongue (indicated in the drawing by the character C) will intersect the line of the handle axis (indicated at D in the drawing) at an angle of about 90° (as indicated by the angle E).

The flat or pad 24 has a shoulder 26 defining its rear edge and is joined to the handle 10 of the tool by an off-set tapered neck 27. By a comparison of Figs. 2 and 3 it will be seen that the upper face 28 and the lower face 29 of the neck 27 are both compound curves so that the neck comprises a tapered offset portion extending laterally from the central axis of the tool handle 10 to the pad 24.

The neck 27 has its side surfaces 31 and 32 flared, however, and of progressively greater width from the handle 10 to the pad 24, so that the cross-sectional area of the neck will not be substantially diminished at any point.

To remove a tire from the rim of a vehicle wheel the operator will insert the tongue of the tool between the rim of the wheel and the bead of the tire and force the tire bead out of engagement with the rim, either by lifting the outer end of the handle, or by swinging the handle laterally. When used in this manner, the narrow and relatively thin leading edge of the tool permits it to be inserted between the bead and the wheel rim without great difficulty, but in the event that the bead is "frozen" to the side wall of the rim the leading edge of the tongue may be forced into place by striking the pad 24 with a hammer or other tool. It should be observed that the pad 24 is spaced rearwardly from the leading edge of the tongue a substantial distance (indicated by A in the drawing) so that it will be easily accessible, in spite of the curved shape of the tire side wall. Further, the fact that the pad is offset from the center line of the handle gives the tool greater stability and tends to overcome any tendency of the tool to twist in the hand of the operator. When the tool has been inserted between the rim and the bead of the tire and raised to bring the surface 23 to bear against the side wall of the tire, it will be apparent that the side wall of the tire is engaged by the full width of the blade, so that any danger of cutting the rubber or fabric of the tire is eliminated. Further, when the tool is so used, the offset neck prevents the most remote portions of the tool from contacting the surface of the tire and thus concentrates the leverage of the tool on the surface 23 and pad 24. Similarly, when the tool is swung laterally to wedge the blade sideways between the rim and tire bead, the tire will be engaged by the rounded shoulders 21 or 22 rather than the thinner and sharper corners of the tongue, so that there will be no possibility of damaging the tire.

The most important dimensions of the tool are listed below.

| | | |
|---|---|---|
| Overall length | inches | 22 |
| Diameter of handle 10 | do | ¾ |
| Width of tongue 14 | do | 1 |
| Thickness of tongue 14 | do | ⅛ |
| Width of shoulders 18 and 19 | do | 7/16 |
| Radii of curves 21 and 22 | do | 5/16 |
| Thickness of shoulders 18 and 19 | do | ¼ |
| Width of pad 24 | do | ½ |
| Width of face 23 | do | 1⅝ |
| Offset A | do | 1 |
| Offset B | do | ½ |
| Angle E | degrees | 90 |

As hereinbefore pointed out, the structure as shown in the drawing of the present application has been designed to meet and remedy a situation that is not adequately met by any of the prior art structures, and it has been found by tests that the type of tool illustrated in this application possesses marked advantages in ease of operation and effective scope of operation as compared with any of the other devices tested.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claims.

Having thus described my invention, I claim:

1. In a tire iron, a relatively long handle portion, a tapered offset neck portion at one end of the handle, said tapered neck portion being in the form of a compound curve so that the end of the neck opposite the handle will lie approximately parallel to the axis of the handle but offset therefrom, said tapered neck porting being of progressively greater width and progressively less thickness toward the end opposite the handle portion, a curved blade portion integral with the said neck, said blade portion being of generally arcuate formation and of a width substantially equal to the maximum width of the neck; the blade being curved on a radius greater than the diameter of the handle and extending through an arc of approximately 90°, so that the blade extends across the center line of the handle and the forward end of the blade lies in a plane normal to the axis of the handle and on the opposite side of the handle from the neck; the blade being of progressively less thickness toward its forward end and having two side shoulders and a center tongue at its forward end, each shoulder being of greater thickness than the center tongue and each having rounded forward edges terminating at the base of the center tongue, said tongue having a width greater than its distance of projection beyond the aforementioned shoulders, and having a thin, straight leading edge adapted to be forced between the bead of a pneumatic tire and the edge of the wheel rim to loosen the tire bead from the rim; together with a pad at the point of juncture btween said blade and neck, the pad being separated from the neck by a low transverse shoulder; said pad including a relatively flat surface parallel to the axis of the handle and offset therefrom a distance not less than the diameter of the handle.

2. In a tire iron, a relatively long handle portion, a tapered offset neck portion at one end of the handle, said tapered neck portion being in the form of a compound curve so that the end of the neck opposite the handle will lie approximately parallel to the axis of the handle but offset therefrom, said tapered neck portion being of progressively greater width and progressively less thickness toward the end opposite the handle portion, a curved blade portion integral with neck, said blade portion being of generally arcuate formation and of a width substantially equal to the maximum width of the neck; the blade being curved on a radius greater than the diameter of the handle and extending through an arc of approximately 90°, so that the blade extends across the center line of the handle and the forward end of the blade lies in a plane normal to the axis of the handle and on the opposite side of the handle from the neck; the blade being of progressively less thickness toward its forward end and having a thin, straight leading edge adapted to be forced between the bead of a pneumatic tire and the edge of the wheel rim to loosen the tire bead from the rim; together with a pad at the point of juncture between said blade and neck, the pad being separated from the neck by a low transverse shoulder; said pad including a relatively flat surface parallel to the axis of the handle and offset therefrom a distance not less than the diameter of the handle; the surface being at right angles to the tongue of the aforementioned blade, and rearwardly spaced apart from said blade a distance not less than the diameter of the handle

IVAN M. TAYLOR.